(12) United States Patent
Ahmad et al.

(10) Patent No.: US 7,760,182 B2
(45) Date of Patent: Jul. 20, 2010

(54) METHOD FOR VIDEO ENABLED ELECTRONIC COMMERCE

(76) Inventors: Subutai Ahmad, 946 Colorado St., Palo Alto, CA (US) 94303-3803; G. Scott France, 555 Stanford Ave., Palo Alto, CA (US) 94306-1113

(*) Notice: Subject to any disclaimer, the term of this patent is extended or adjusted under 35 U.S.C. 154(b) by 0 days.

(21) Appl. No.: 11/507,794

(22) Filed: Aug. 21, 2006

(65) Prior Publication Data

US 2006/0282387 A1 Dec. 14, 2006

Related U.S. Application Data

(63) Continuation of application No. 09/371,462, filed on Aug. 1, 1999, now Pat. No. 7,113,918.

(51) Int. Cl.
*G09G 5/00* (2006.01)
(52) U.S. Cl. .................. 345/156; 715/863; 382/209
(58) Field of Classification Search ........... 345/156, 345/158, 157; 715/863, 719; 382/209, 218
See application file for complete search history.

(56) References Cited

U.S. PATENT DOCUMENTS

| | | | |
|---|---|---|---|
| 6,072,494 A * | 6/2000 | Nguyen | 715/863 |
| 6,191,773 B1 * | 2/2001 | Maruno et al. | 345/158 |
| 6,363,160 B1 * | 3/2002 | Bradski et al. | 382/103 |
| 6,434,255 B1 * | 8/2002 | Harakawa | 382/103 |
| 6,636,219 B2 * | 10/2003 | Merrick et al. | 345/473 |
| 6,681,031 B2 * | 1/2004 | Cohen et al. | 382/103 |

* cited by examiner

*Primary Examiner*—Kevin M Nguyen
(74) *Attorney, Agent, or Firm*—Workman Nydegger

(57) ABSTRACT

A method is provided for conducting commerce over a network via vision-enabled content. First, content is encoded to convert it into vision-enabled content. Payment is received for vision-enabling the content. Also, a program to decode the vision-enabled content is provided. Finally, the vision-enabled content is sent to a user over a network. The program decodes the vision-enabled content and receives an image of the user. The vision-enabled content may include advertising content, entertainment content, and educational or instructional content. In one embodiment, the program combines the image of the user with the vision-enabled content. In another embodiment, the program utilizes the image of the user to control the vision-enabled content.

20 Claims, 14 Drawing Sheets

FRAME DATA SET

LEFT EXTREMITY (X,Y)
RIGHT EXTREMITY (X,Y)
CENTER OF MASS (X,Y)
WIDTH (X,Y)
TOP OF HEAD (X,Y)
CENTER OF HEAD (X,Y)

*Fig.8B*

METHOD FOR VIDEO ENABLED ELECTRONIC COMMERCE

This is a Continuation of application Ser. No. 09/371,462, filed Aug. 1, 1999 now U.S. Pat. No. 7,113,918, which is hereby incorporated by reference.

BACKGROUND OF THE INVENTION

1. The Field of the Invention

The present invention relates to electronic commerce, and more particularly to conducting electronic commerce by enabling creation of vision-enabled content.

2. The Relevant Art

Activities such as advertising, entertainment and education are commonly conducted over a network such as the Internet. The creator of an activity conducts that activity by publishing content which then becomes available to users who are connected to the network and have the necessary program to receive and display that content, such as a web browser. For example, advertisements in the form of linked banners appear on a multitude of websites. Streaming audio and video as well as audio and video clips have become commonplace. Further, virtual classrooms and interactive learning materials are being used for long-distance learning.

Such activities, however, are constrained by the limitation of the technology being used to send, receive and navigate them. Users receiving content over a network currently interact with the content with input devices such as a mouse and keyboard. As a result, true interaction with the content must be left to the imagination. Users viewing an advertisement for shirts, for example, may be able to select different styles and colors of shirts, but would not be able to see himself or herself wearing the shirt. Since the user does not know how he or she looks in the shirt, the user is less likely to purchase the shirt from the advertiser and will more likely go to a store where the user may try the shirt on before purchase. Thus, the advertiser will probably lose the sale.

The problem is similar in entertainment. There are currently several products on the market which allow replay of downloaded audio and video. For example, Windows Media Player by Microsoft® Corporation and RealPlayer by RealNetworks, Inc. allow an entertainment producer to transmit audio and video clips as well as streaming audio and video. Both of these products allow the user to interact with the content in the limited sense that the user is able to select the clips and streams and start and stop playback at will.

Unfortunately, these products are directed towards playback of content alone. Most users prefer to watch motion video on a television rather than over the Internet, typically because of the location and smaller size of the computer display. If the content is the same, there is little reason to watch it on the computer. There needs to be something that makes a user want to watch the content on the computer, such as a vision-based interaction between the user and the content.

Network gaming is a popular pastime for many people. While gaming technology has come far, gaming is still very impersonal in that the animated characters that represent each player bear only the likeness given it by the programmer and no resemblance to the actual player. Game play would be much more enjoyable if the animated characters of a game bore the likenesses of the associated players.

Adding to the impersonality of gameplay are game controllers. The realism of the game can often depend on how the player's commands are input into the computer. Movement of a user to make the animated character perform a similar movement is much more desirable than pushing a button to make a movement. Take, for example, a boxing game. A player would be much more likely to enjoy the game if the player could physically move his or her arm in a punching motion and see the animated character make a similar move in the game.

SUMMARY OF THE INVENTION

A method is provided for conducting commerce over a network via vision-enabled content. First, content is encoded to convert it into vision-enabled content. Payment is received for vision-enablement of the content. Also, a program to decode the vision-enabled content is provided. Finally, the vision-enabled content is sent to a user over a network. The program decodes the vision-enabled content and receives an image of the user. The vision-enabled content may include advertising content, entertainment content, and education content.

In one embodiment of the present invention, the program combines the image of the user with the vision-enabled content. The encoding allows a content publisher to distribute virtual content which can be received and interacted with by a user. For example, this would allow display of the user image interacting with a product or as part of entertainment content, such as an image of the user wearing a piece of clothing or along side a music star in a music video. This also allows a plurality of users to interact with each other, such as playing a game in which characters in the game bear resemblance to the users.

In another embodiment of the present invention, the program utilizes the image of the user to control the vision-enabled content. Controlling of the content includes not only selecting certain images based on the user image, but also controlling the way the content appears, such as using the person image to control the way a character moves through a game for example, with the game flow changing as a result of the actions of the character. In this way, a user is able to use movements to control the content being perceived by the user.

The encoding of the content may be performed via tools with payment being received in exchange for use of the tools. This allows a content provider to create its own vision-enabled content.

In one aspect of the present invention, payment may be received based on a number of users receiving the vision-enabled content. Alternatively, payment could be received based on a quantity, i.e., an amount, of vision-enabled content sent. Payment may also be received from a content provider for storing the vision-enabled content.

In another aspect of the present invention, payment is received from the user. For instance, payment could be received from the user in exchange for the program. Optionally, an upgrade for the program can be offered. Payment could be received in exchange for the upgrade.

To personalize the content, an identity of a user may be recognized, such as from the person image, and the vision-enabled content can be selected based on the identity of the user. The user may also be associated with a group and the vision-enabled content selected based on the association of the user with the group.

As an option, body part recognition may be performed on the person image. This allows the user to assist in the selection of the content such as by performing a particular gesture. As an option, the content may be selected based on an interpretation of movement of the body part of the user.

The outputted content may include an interaction between the person image and the content, such as a portion of the person image appearing to interact with video images. As mentioned previously, body part recognition may be performed on the person image. In such case, the content may include an image of the body part of the user. The content may be output in real time via a data stream or sent in encapsulated form.

A background may be removed from the person image to assist in the recognition of a user in the person image. The background may also be removed to allow a portion of the person image to appear to interact with the content.

As an option, statistical data may be collected and used to create user profiles and informational databases. Optionally, payment may be received in exchange for access to the statistics.

These and other aspects and advantages of the present invention will become more apparent when the Description below is read in conjunction with the accompanying Drawings.

BRIEF DESCRIPTION OF THE DRAWINGS

The present invention will be readily understood by the following detailed description in conjunction with the accompanying drawings.

FIG. 8B shows data stored in a frame data set as derived from a data or image frame containing a subject performing a gesture as described in block 802 of FIG. 8A;

DETAILED DESCRIPTION OF THE PREFERRED EMBODIMENTS

Figure 1:
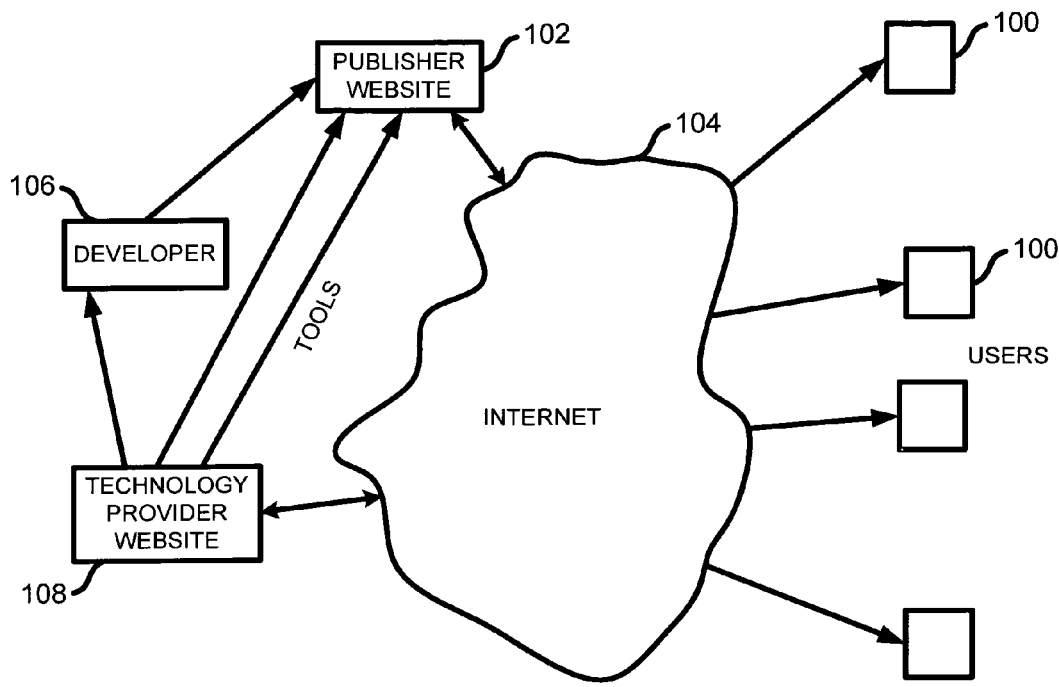
FIG. 1 is a diagram illustrating an interconnection between users, a content developer, a content publisher, and a technology provider in accordance with a business model of the present invention.

The present invention is adapted for controlling content based on an image or series of images of a user. With reference to FIG. 1, a user 100 connects to a content publisher's website 102 over a wide area network 104, e.g., the Internet, via a station, i.e., a computer, or other processing device such as a television. Vision-enabled content is sent to the user's computer in either encapsulated or streaming form over the wide area network 104 from the content publisher's website 102 where it is presented to the user via display or audio. An image or plurality of images of a user 100 are received and content based on the image of the user is selected from the vision-enabled content and displayed in such a way that the content appears to interact with the user 100, e.g., a portion of the image of the user 100 appears with the content, and/or movements of the user are recognized and used to control the content. More detail is provided below.

The content offered by the content publisher 102 may be created by a content developer 106 and sent to the content publisher. The tools, i.e., programs and hardware, necessary to encode the content into the vision-enabled format may be received from a technology provider 108. These programs and tools may be sent to either the content publisher or the content developer, or both.

Figure 2:
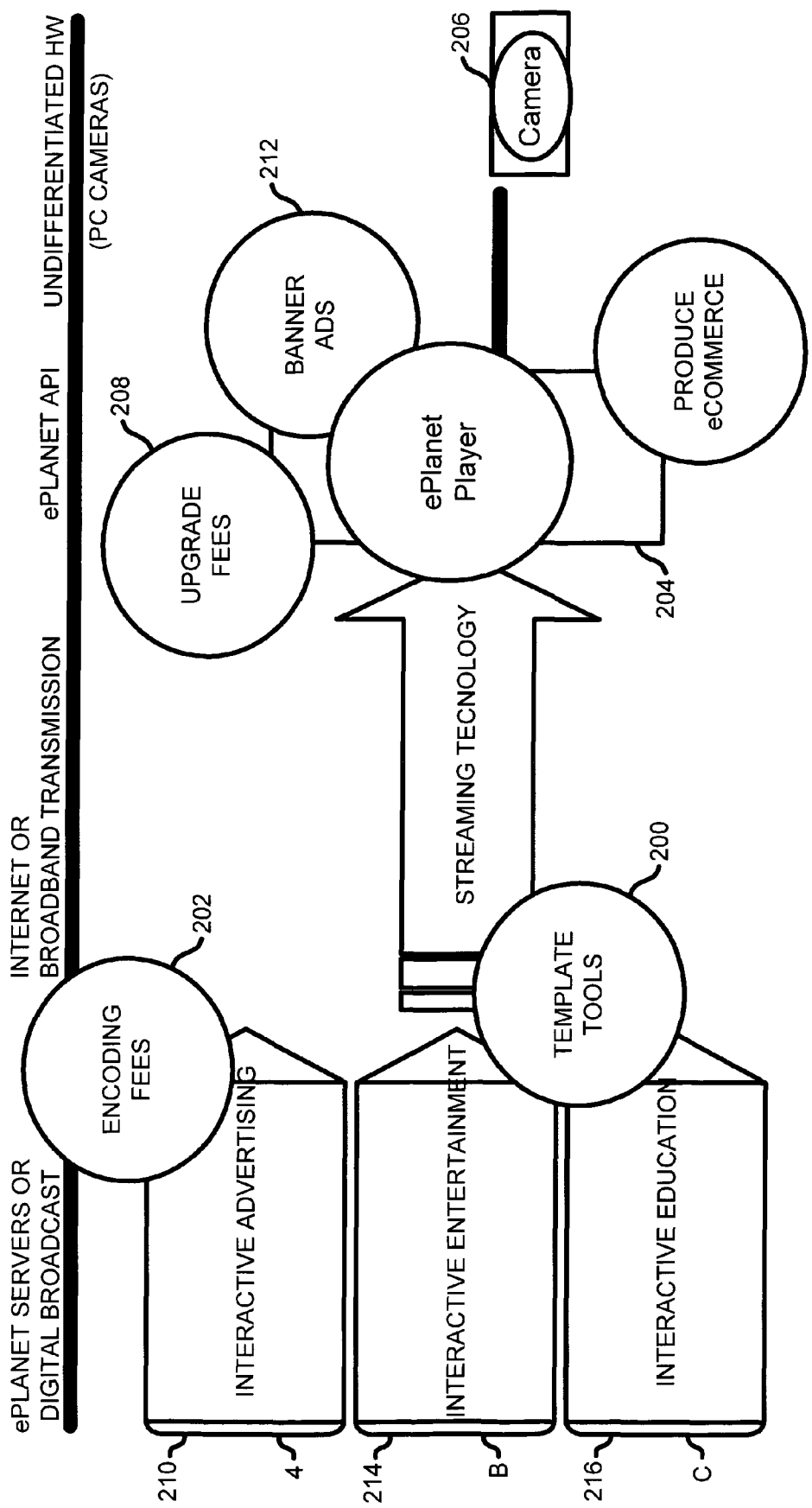
FIG. 2 is a diagram illustrating components of a business model of the present invention.

FIG. 2 is a diagram that illustrates various components a business model of the present invention. First, the content is encoded in a manner that converts it into vision-enabled content. The content may include streaming video, animated objects, web pages, games, advertising, educational applications, audio data, or anything else. As mentioned above, some or all of the tools 200 necessary to perform such encoding may be provided to a content provider, such as a content publisher or developer. This allows the content provider to create its own vision-enabled content. Payment would be received in exchange for use of these tools 200.

Alternatively, the technology provider may receive the content and perform the encoding of the content. Encoding fees 202 would be charged for performing the encoding. Once encoded, the content is sent to a publisher's website for dissemination.

The encoded content is sent to a user over a network. Preferably, the vision-enabled content is sent to the user's station via a data stream or in the form of an applet, where it is decoded by a program, e.g., a plug in 204. The data stream may be compressed. The plug in receives an image of the user from a camera 206 connected to the user's station. The applet may control the content based on the person image. Alternatively, the content may be controlled from the content provider's location. In either case, the user is allowed to interact with the content, as discussed below in more detail.

The plug in 204 and/or applet could be downloaded from the technology provider or content publisher. Preferably, a basic version of the plug in is downloadable for free. Alternatively, the user may be charged for the plug in 204. The user may be able to download an upgrade for the plug in, for which upgrade fees 208 may be charged to the user. It should be kept in mind that the plug in and/or applet could also be installed from a computer readable medium such as a floppy disk or compact disc.

Fees may be charged to the content provider based on number of downloads of content, amount of content transmitted over the network, etc. Fees may also be charged per data stream or per group of data streams up to or over a predetermined number. These would be kept track of via statistics returned to either the content provider or the technology provider. Alternatively, fees may be charged based on the size of the audience that the content provider wishes to address. Payment may also be received from a content provider for storing and hosting the vision-enabled content.

In one embodiment of the present invention, interactive advertising 210 is sent to a user. A fee may be charged to an advertiser for each time a vision-enabled advertisement is selected, such as when a user clicks on a banner advertisement 212. In another embodiment, interactive entertainment 214 is sent to the user. In yet another embodiment, interactive education 216 is sent to the user.

As an option, the plug in and encoding may be provided for free in order to collect statistics. These statistics may be made available for a fee.

Figure 3:
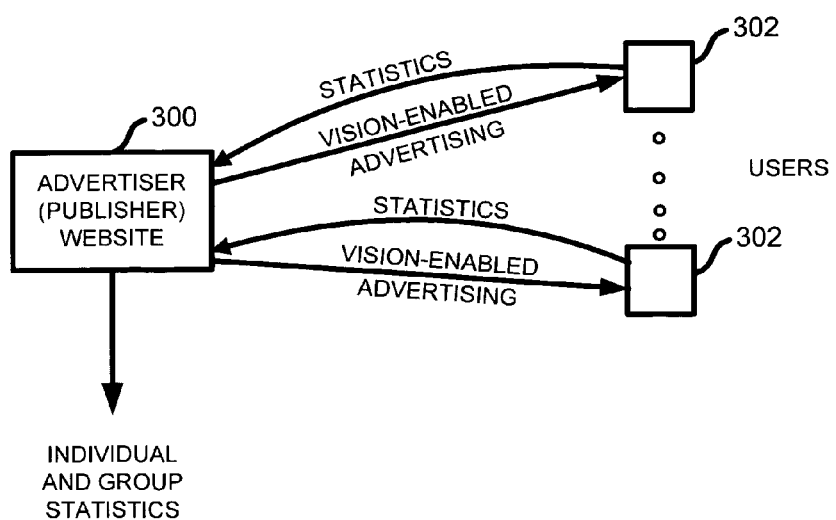
FIG. 3 illustrates an advertising model of the present invention corresponding to block A of FIG. 2.

FIG. 3 illustrates an advertising model of the present invention corresponding to block A of FIG. 2. In this model, a content publisher provides a website 300 which offers interactive advertising. Interactive advertising includes such things as encapsulated banners that begin an automatic download of the applet containing the vision-enabled content, web pages with products displayed, etc. when clicked on. Users 302 connect to the content publisher's website via a wide area network and are allowed to browse web pages of the website 300. The publisher may receive statistics on the browsing habits of the users, such as how long the user 302 was connected to the website 300 and whether the user 302 interacted with an advertisement on a web page. Further, group statistics may be collected. Also, eye tracking may be used to determine whether the user 302 looked at an advertisement. It should be noted that the advertising model is given by way of example and in no way is it intended to limit the present invention merely to advertising.

Figure 4:
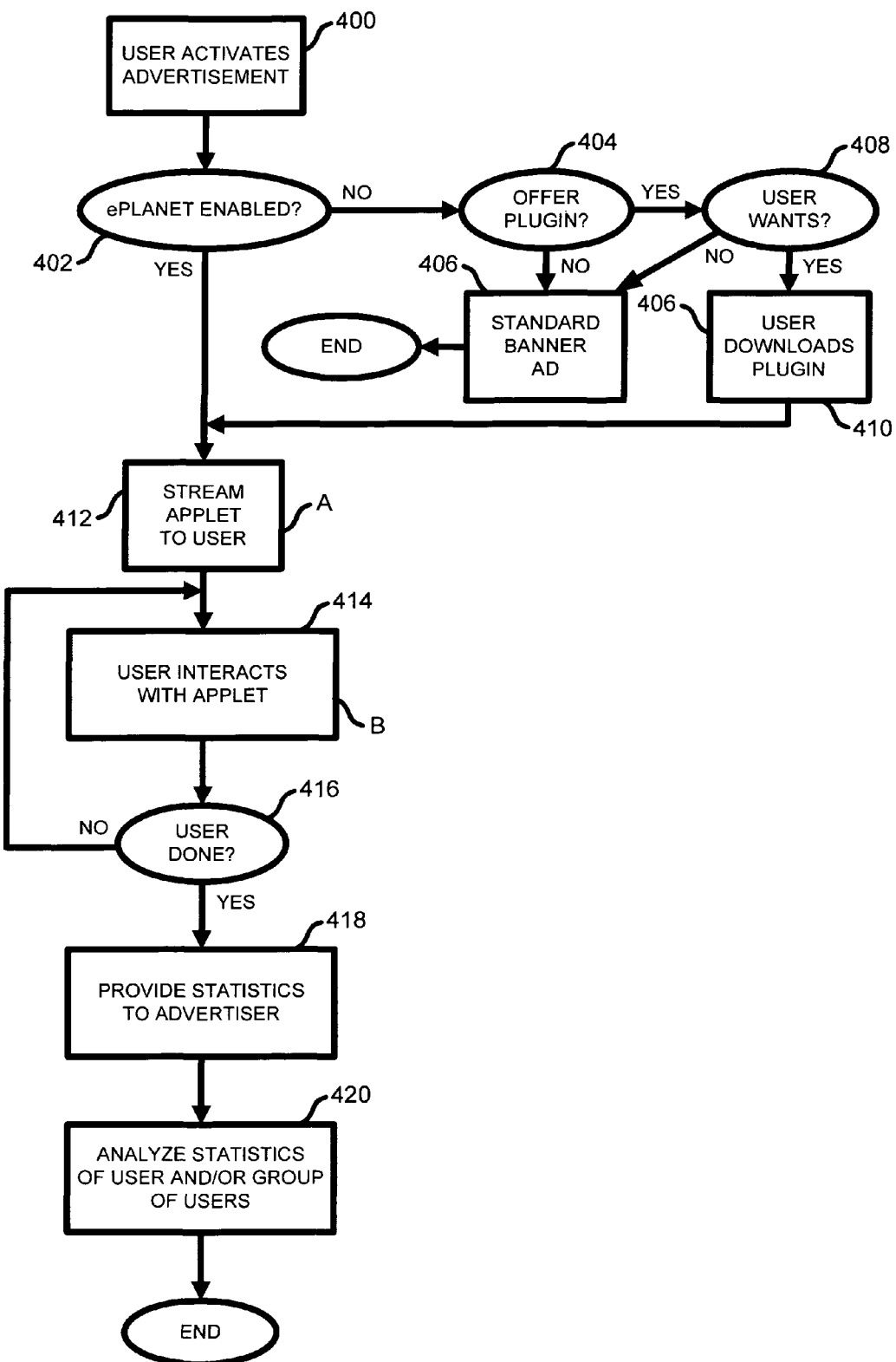
FIG. 4 illustrates a process flow of the advertising model shown in FIG. 3 in accordance with one embodiment of the present invention.

FIG. 4 illustrates an exemplary process flow of the advertising model shown in FIG. 3. In operation 400, a user activates an advertisement such as by clicking on a banner with a mouse. In operation 402, it is determined whether the user has the plug in and whether it is enabled. This is preferably done by the content publisher's website. If it is determined that the user does not have the plug in, it is determined whether the plug in will operate on the user's system in operation 404. This determination may be based on hardware and/or software considerations, such as whether the plug in is compatible with the user's web browser. If the plug in is not compatible with the user's computer, a standard advertisement is sent to the user's computer in operation 406 via HTML.

If the plug in is compatible with the user's computer, in operation 408 it is determined whether the user wants the plug in. If the user indicates that the user does not want the plug in, the standard advertisement is sent to the user's computer, as in operation 406. If the user indicates that the user wants the plug in, the plug in is sent to the user's station in operation 410 from either the technology provider's website or the content publisher's website. The user may then install the plug in.

If the plug in is enabled, or the user has installed the plug in, content in the form of an applet is streamed to the user in operation 412. (See the discussion of FIG. 5A below for more detail on operation 412.) In operation 414, the user interacts with the applet. (See the discussion of FIG. 5B below for more detail on operation 414.) When the user is finished interacting with the applet, determined in operation 416 such as by determining when the user leaves a web page or closes the applet, statistics are provided to the content producer in operation 418. In operation 420, the statistics are analyzed. These statistics can include things that are unique to this particular user, or can be combined with statistics of many users. It should be noted that the applet may be received as a single file or may be streamed to the user.

Figure 5A:
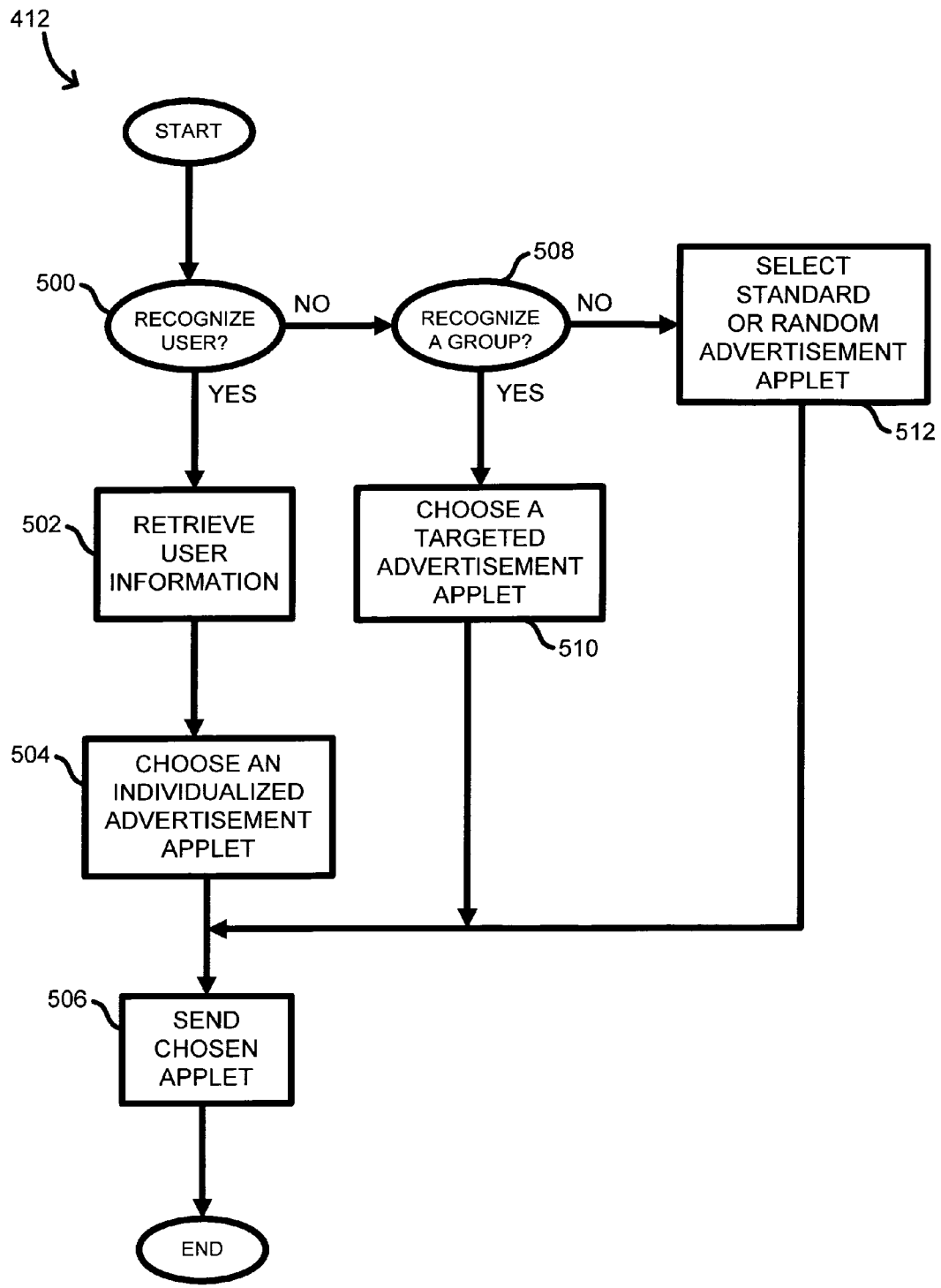
FIG. 5A illustrates a process of the present invention associated with operation 412 of FIG. 4 for personalizing content.

FIG. 5A depicts an optional process associated with operation 412 of FIG. 4 for personalizing content. First, in operation 500, a recognition of the user takes place. For example, the user may be recognized based on a cookie, an email address of the user, or user indicia. The cookie could be stored on the user's station or the advertiser's server. Alternatively, the user may be recognized based on image comparison by comparing the person image to images stored in a database. Optionally, user-entered identification indicia may be received. Such user-entered indicia could be used to allow access to an exclusive section of a website, such as one reserved for registered users of the plug in, applet, or site only.

If the user is recognized in operation 500, user information is retrieved from a database in operation 502. Such user information could include information previously input by a user, past purchases, and statistical information collected from previous browsing by the user. One example would be determining interests and/or buying habits of the user based on advertisements selected by the user in previous sessions or products previously purchased. An individualized advertisement applet is selected in operation 504 based on the user information and sent to the user in operation 506.

If the user is not recognized in operation 500, an attempt to associate the user with a group is performed in operation 508. The association may be made based on information such as the user's email address or user-input interests. Further, an association may be imputed by country as well as from the type of site being visited: commercial, government, technical. If the user can be associated with a group, an advertisement applet is chosen in operation 510 that is targeted at the group with which the user is associated. If the user cannot be associated with a group, a standard or random advertising applet is selected in operation 512 and sent to the user as in operation 506.

Figure 5B:
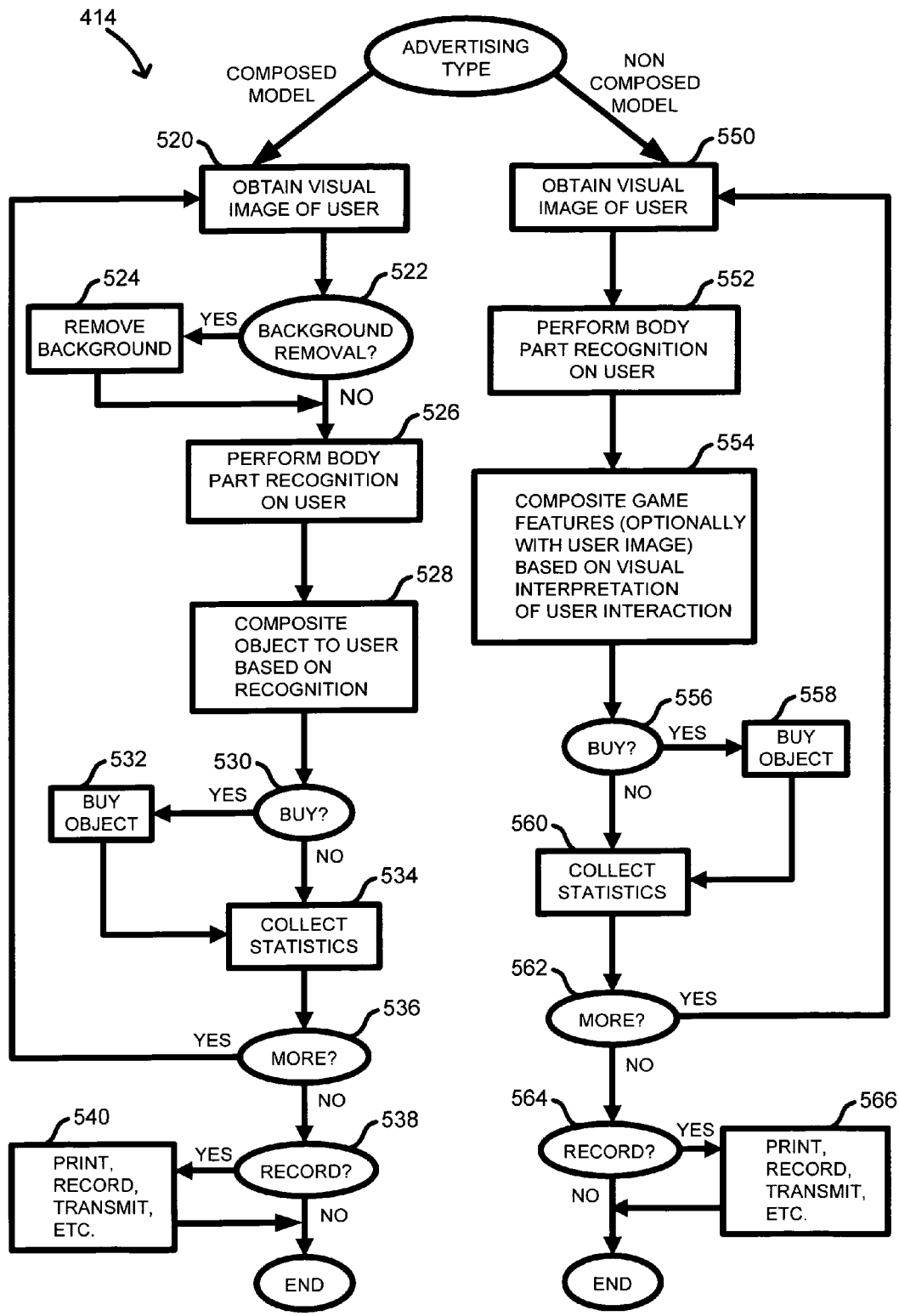
FIG. 5B illustrates processes associated with operation 414 of FIG. 4 in accordance with one embodiment of the present invention.

FIG. 5B shows exemplary processes associated with operation 414 of FIG. 4. More particularly, FIG. 5B illustrates what occurs at the user's station after receipt of the applet.

In a composited model of the process, an image of the user appears in the content. First, a visual image of the user taken by a camera is received in operation 520. Preferably, it is determined whether to remove a background from the image of the user in operation 522 in order to extract a person image. Removal of the background from the person image assists in the recognition of a user in the person image as well as reduces error caused by animate objects located in the background, such as a television picture. The background may also be removed to allow a portion of the person image to appear to interact with the content.

If the background of the image is to be removed, it is removed in operation 524. More information about extracting an image from its background may be found in a patent application entitled "METHOD AND APPARATUS FOR PERFORMING A CLEAN BACKGROUND SUBTRACTION" filed Oct. 15, 1998 under application Ser. No. 09/174, 491 and which is herein incorporated by reference for all purposes.

In operation 526, body part recognition is performed on the image or extracted person image of the user to identify a head, eyes, arms, torso, etc. of the user. Further details regarding detecting body parts may be found in a patent application filed Jul. 30, 1999 entitled "SYSTEM, METHOD AND ARTICLE OF MANUFACTURE FOR TRACKING A HEAD OF A CAMERA-GENERATED IMAGE OF A PERSON" which is incorporated herein by reference in its entirety.

In operation 528, an object such as a product for sale is composited to the image of the user by utilizing the body part recognition. For example, the user's head may be shown wearing a hat. Further details regarding compositing objects to an image of a user may be found in a patent application filed Oct. 15, 1997 entitled "METHOD AND APPARATUS FOR MODEL-BASED COMPOSITING" under application Ser. No. 08/951,089 and which is herein incorporated by reference in its entirety.

In operation 530, the user is given the opportunity to purchase the object with which his or her image was interacting. The purchase may be completed in operation 532. Statistics are collected in operation 534 in a manner similar to that presented above. The user is given the choice to continue or quit in operation 536. If the user wishes to continue, such as to view other objects composited to his or her image, some or all of operations 520 through 536 are repeated until the user wishes to quit. A record of some of the occurrences is offered to the user in operation 538 and created in operation 540 if the user desires one. The record could include a visual copy of the interactive session just completed, financial information if an object was purchased, and statistical information.

In an exemplary scenario, a user with the necessary plug in connects to a website with an advertisement, e.g., banner, for sunglasses. The user wishes to purchase a pair of sunglasses, but wishes to see how he or she will look wearing the sunglasses. The user clicks on the advertisement, which begins a download of vision-enabled content to the user's station. The plug in detects the camera connected to the user's station and receives an image of the user. The user's head is identified in the image of the user and may be separated from the rest of the user's body to form a person image. The user's eyes are also identified in the image of the user to determine proper placement of the sunglasses. Meanwhile, the user browses the advertisements for a pair of sunglasses to "try on". Upon selection of a pair of sunglasses, such as by pointing and clicking on a desired pair of sunglasses, the person image of the user's head is processed to composite the selected pair of sunglasses to the person image. Then, the image of the user's head is displayed wearing the pair of sunglasses over the eyes. The user could then select different pairs of sunglasses to "try on", each of which would appear on the present person image of the user's head or on a new person image of the user's head.

Preferably, multiple images of the user turning his or her head would be captured to allow the user to manipulate the image of the head to permit viewing of a face as well as a profile for example. Two images would produce only the face and profile views. However, multiple images taken as the user turns his or her head could be used to produce the appearance of a rotating head interacting with the content. It should be kept in mind that this scenario could apply to any body part recognized in operation 526, not just the head.

Feedback may be sent to the advertiser to indicate which pair of sunglasses the user is currently looking at. Alternatively or in combination with the feedback, statistics may be sent to the advertiser upon termination of the session. Such statistics could include the amount of time the user spent looking at sunglasses, a listing of pairs of sunglasses selected, activities requested by the user, such as head rotation, etc. The statistics may then be used to create a user profile. The statistics may also be used to assist the advertiser in improving its content.

In a non-composited model of the process, the user is utilized as an input device to control the content. In other words, images of the user are used to control movement of objects in the content as well as the flow of the content. It should be kept in mind that an image of the user may still be displayed interacting with the content. First, a visual image of the user taken by a camera is received in operation 550. In operation 552, body part recognition is performed on the image of the user to identify a head, arms, or torso, etc. of the user. Preferably, multiple images of the user are received in real time via a data stream so that consecutive images may be compared to allow detection of movement.

A visual interpretation of user movement is performed in operation 554 and used to select content for display. In this way, movement of the user controls the content. In one embodiment, gesture recognition may be performed. For example, pointing up and down may be used to control scrolling of a web page, as may facing up and down with the head. More information on gesture recognition is found in a patent application entitled "Method and Apparatus for Real-Time Gesture Recognition," filed Oct. 15, 1997, under application Ser. No. 08/951,070, which is herein incorporated by reference in its entirety and which is partially set forth below (with the figure numbers and reference numbers changed to avoid duplication).

Figure 8A:
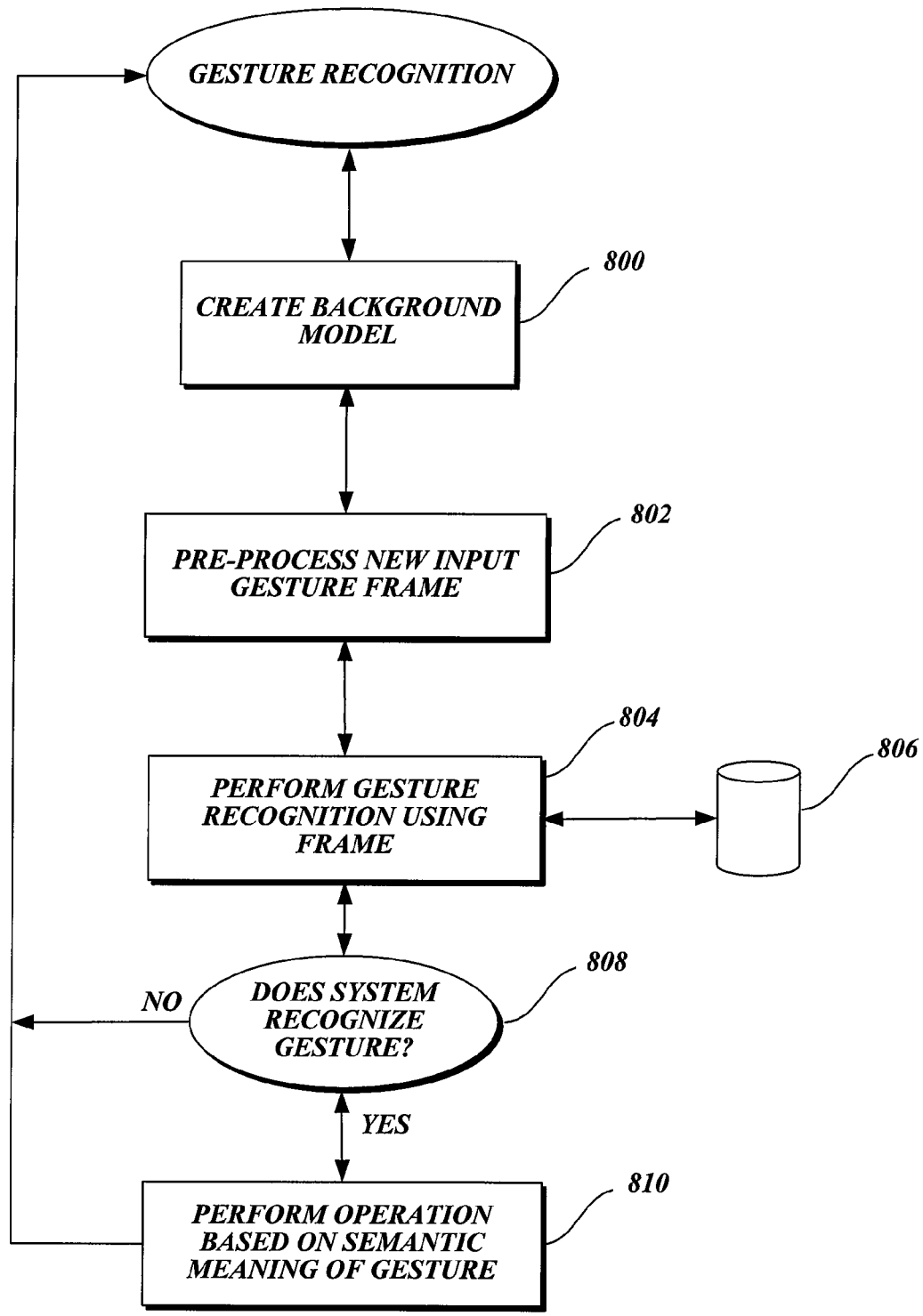
FIG. 8A is a flowchart showing a process for a preferred embodiment for gesture recognition of the present invention.

FIG. 8A is a flow diagram showing a process for a preferred embodiment of object gesture recognition of the present invention. At 800, the system creates or digitally builds a background model by capturing several frames of a background image. The background image is essentially the setting the system is being used in, for example, a child's playroom, an office, or a living room. It is the setting in which the subject, e.g., a person, will enter and, possibly, perform a gesture. A preferred embodiment of creating a background model is described in an application titled "Method and Apparatus for Model-Based Compositing," by inventor Subutai Ahmad, assigned to Electric Planet, Inc., filed on Oct. 15, 1997, application Ser. No. 08/951,089.

Once the background model is created in block 800, in a preferred embodiment the system preprocesses an image frame within which the subject is performing a particular gesture in block 802. In a preferred embodiment this preprocessing involves compositing the object onto a destination image and displaying the destination image on a computer monitor, as described with respect to FIG. 2 above (see FIG. 2 of U.S. Pat. No. 6,072,494). The compositing process can involve sub-processes for reducing the effect of shadows and filling holes and gaps in the object once composited. The destination image can be an image very different from the background image, such as an outdoor scene, outer space, or other type of imaginary scene. This gives the effect of the person performing a gesture, and being augmented or transformed, in an unusual environment or setting. A preferred embodiment of the compositing process is described in detail in co-pending application titled "Method and Apparatus for Model-Based Compositing," by inventor Subutai Ahmad, assigned to Electric Planet, Inc., filed on Oct. 15, 1997, application Ser. No. 08/951,089.

At 804, the system analyzes the person's gesture by performing a gesture recognition process using as data a sequence of image frames captured in block 802. A preferred embodiment of the gesture recognition process is described in greater detail with respect to FIG. 9. The gesture recognition process is performed using a gesture database as shown in block 806. Gesture database 806 contains data arrays representing gestures known to the system and other information such as status reports, described in greater detail below. The gesture recognition process deconstructs and analyzes the gesture or gestures being made by the person. At 808, the system determines whether the gesture performed by the person is actually a recognized or known gesture. The system has a set of recognizable gestures to which the gesture being performed by the person is compared. The data representing the recognizable gestures is stored in data arrays, described in greater detail with respect to FIG. 9 below. If the gesture performed by the person is a recognizable gesture, the system proceeds to block 810. At 810, the system performs a particular function or operation based on the semantic meaning of the recognized gesture. As described above this meaning can translate to transforming the person to another figure, like a bird, or augmenting the person, for example, by adding a hat.

Once the system recognizes a gesture and performs an operation based on the gesture, the system returns to block 802 and continues analyzing image frames of the person performing further gestures. That is, even though the person has performed a gesture recognizable to the system and the system has carried out an operation based on the gesture, the processing continues as long as the image frames are being sent to the system. The system will continue processing movements by the person to see if they match any of its recognizable gestures. However, if the gesture performed by the person is not recognized by the system, control also returns to block 802 where the system captures and preprocesses the next frame of the person continuing performance of a gesture (i.e., the person's continuing movements in front of the camera).

FIG. 8B shows data stored in a frame data set as derived from an image frame containing the person performing a gesture as described in block 802 of FIG. 8A. In a preferred embodiment, the frame data set shown in FIG. 8B contains x and y coordinate values of certain portions of a person performing a gesture. For example, these portions can include a left extremity, a right extremity, a center of mass, width, top of head, and center of head. In this example, the left and right extremities can be the end of a person's right and left arms and the width can be the person's shoulder span. In other preferred embodiments, the coordinates can be of other significant or relevant portions depending on the subject performing the movements and the type of movement. The frame data set contains information on the positions (via x and y coordinates) of significant or meaningful portions of the subject's "body." What is significant or meaningful can depend on the nature and range of gestures expected to be performed by the object or that are recognized or known to the system. For example, the left and right extremities of a person are significant because one of the recognizable gestures is flapping of the arms which is determined by the movement of the ends of the person's arms. In a preferred embodiment, each image or data frame captured has a corresponding frame data set. The sequence of frame data sets is analyzed by the gesture recognition process as shown in block 804 of FIG. 8A and described in greater detail in FIGS. 9 and 10. As will be described in greater detail below, information from the frame data set is extracted in various combinations and can also be scaled as needed by the system. For example, with an arm flapping gesture, the system would extract width coordinates, coordinates of right and left extremities, and center of mass coordinates, and possibly others. Essentially, the frame data set indicates the location of significant parts of the moving subject at a given moment in time.

Figure 9:
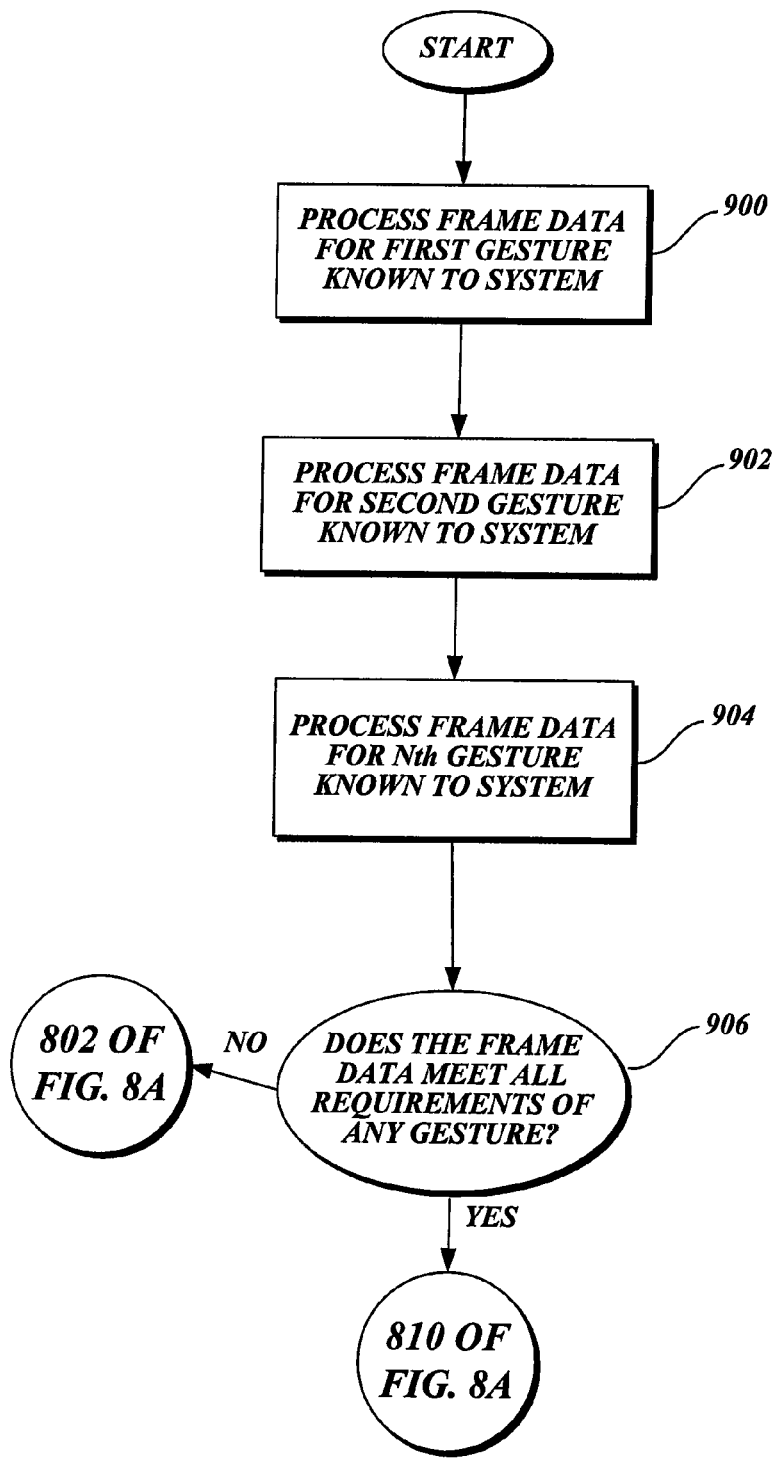
FIG. 9 is a flowchart showing in greater detail block 804 of FIG. 8A in which the system runs the gesture recognition process.

FIG. 9 is a flow diagram showing in greater detail block 804 of FIG. 8A. In step 900, the system processes the frame data for a known gesture (gesture #1). This process is repeated for each known gesture contained in the gesture database shown in FIG. 8A as item 806. Once the frame data has been compared to gesture data as shown in blocks 900 through 904 (known gesture #N), the system then determines whether the gesture made by the moving subject meets any of the completion requirements for the known gestures in the system in block 906. If the moving subject's gesture does not meet the requirements for any of the known gestures, control returns to block 802 of FIG. 8A in which the system preprocesses a new frame of the moving subject. If the moving subject's gesture meets the requirements of any of the known gestures, the system then performs an operation based on the semantic meaning of the recognized gesture. For example, if the gesture by the moving object is recognized to be a flapping gesture, the system can then transform the human figure on the monitor into a bird or other objects. The transformation to an image of a bird would be an example of a semantic meaning of the arm flapping gesture.

Figure 10A:
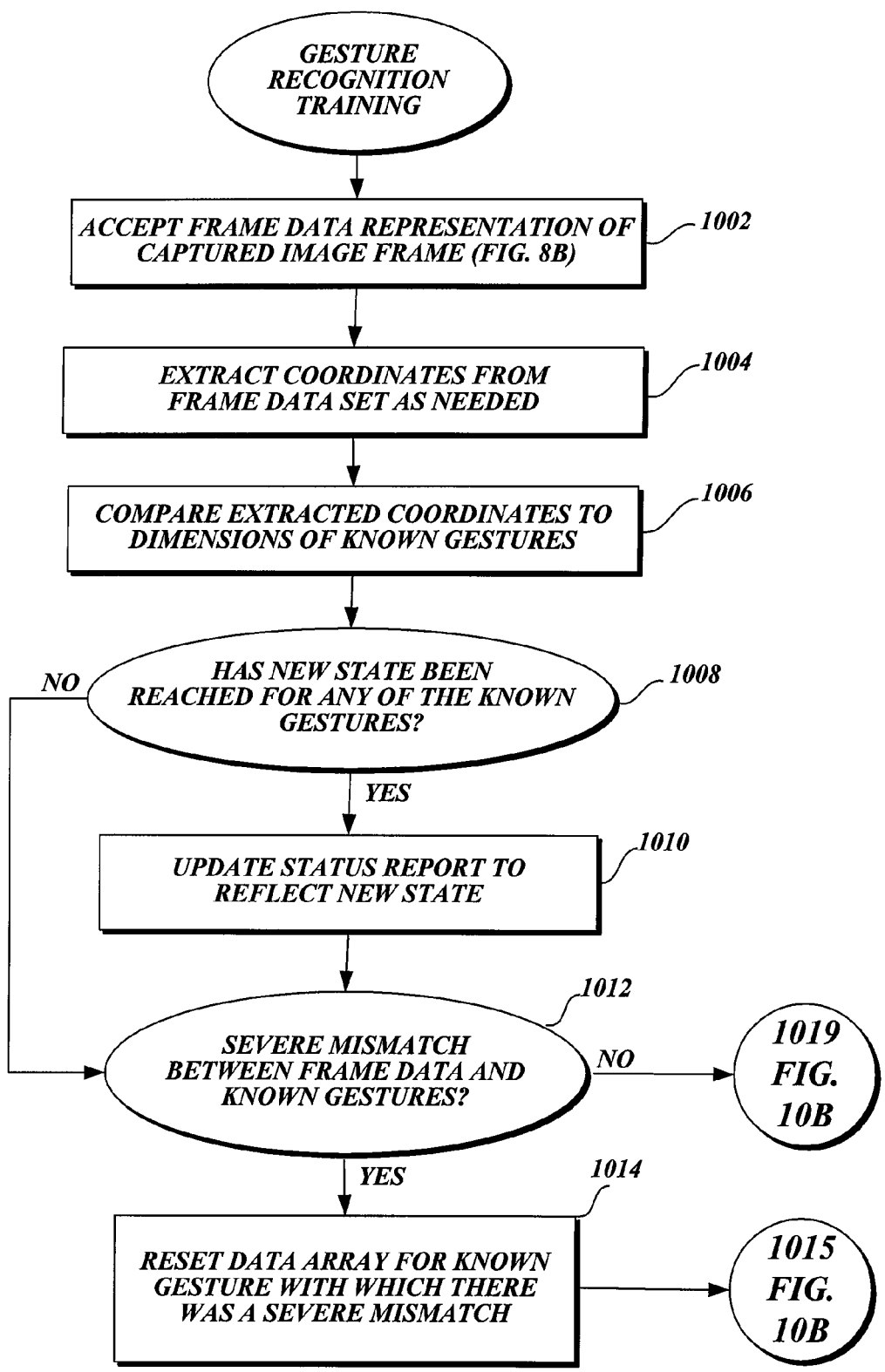
FIGS. 10A and 10B are flowcharts showing in greater detail block 900 of FIG. 9 in which the system processes the frame data to determine whether it matches a recognized gesture.
Figure 10B:
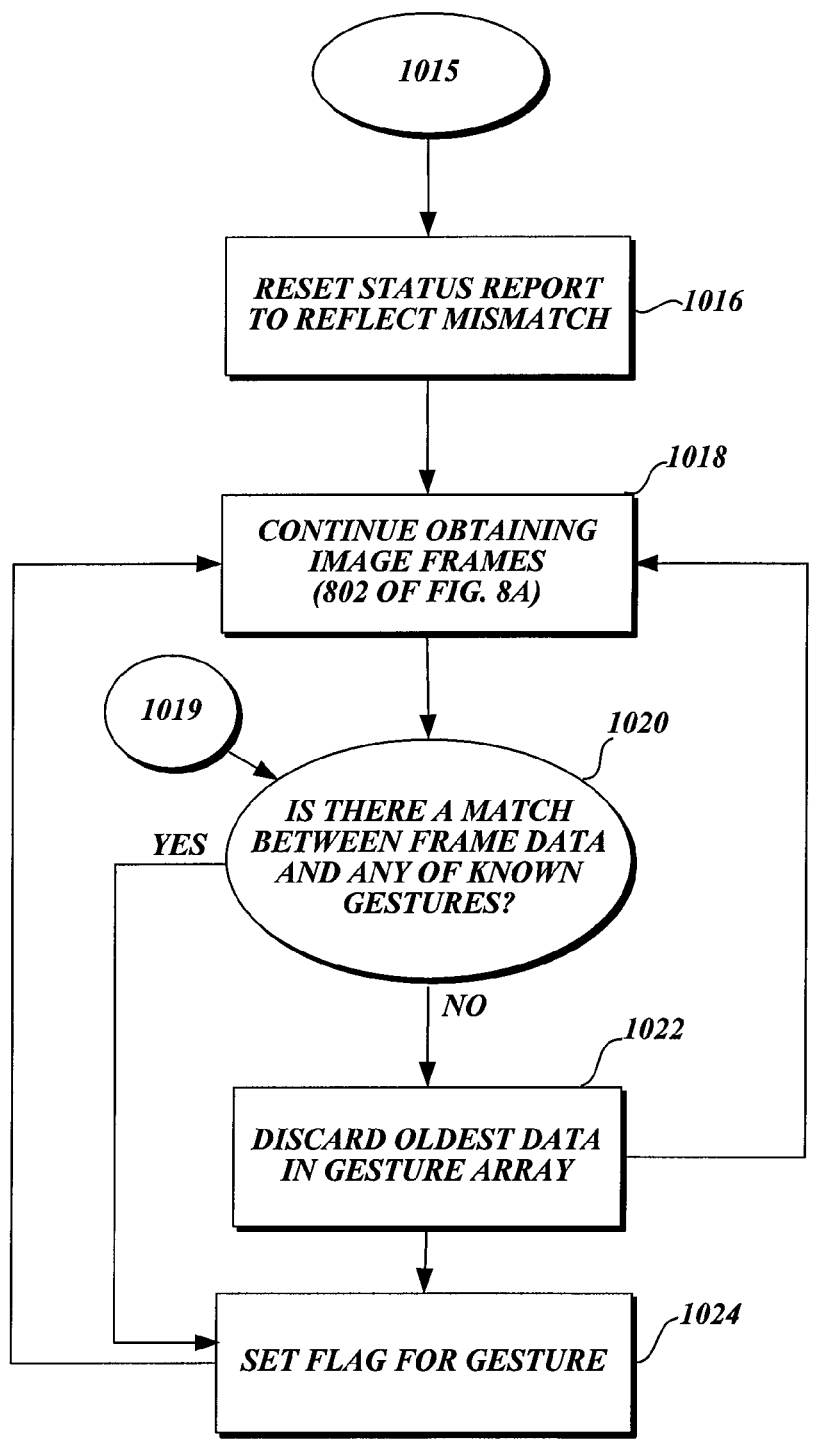

FIG. 10 is a flowchart showing in greater detail block 900 of FIG. 9 in which the system processes the frame data to determine whether it matches the completion point of a known gesture. At 1000 the system begins processing a frame data set representative of a captured image frame. An example of a frame data set is shown in FIG. 8B. As described above, the frame data set contains coordinates of various significant positions of the moving subject. The frame data set contains information on the moving subject at one particular point in time. As will be described below, the system continues capturing image frames and, thus, deriving frame data sets, as long as there is movement by the subject within view of the camera.

At 1002, the system will extract from the frame data set positional coordinates it needs in order to perform a proper comparison with each of the gestures known or recognizable to the system. For example, a known gesture, such as squatting, may only have two relevant or necessary coordinates that need to be checked, such as top of head and center of mass. Other coordinates do not need to be checked in order to determine whether a person is performing a squatting movement. Thus in block 1002, the system extracts relevant coordinates from the frame data set (in some cases it may be all the available coordinates) for comparison to known gestures.

At 1004, the system compares the extracted positional coordinates from the frame data set to the positional coordinates of a particular point of the characteristic pattern of each known gesture. Each of the known gestures in the system is made up of one or more dimensions. For example, the flapping gesture may have four dimensions: normalized x and y for the right arm and normalized x' and y' for the left arm. A jump may have only two dimensions: one for the normalized top of the head and another for the normalized center of mass. Each dimension turns out a characteristic pattern of positional coordinates representing the expected movements of the gesture in a particular space over time. The extracted positional coordinates from the frame data set is compared to a particular point along each of these dimensional patterns for each gesture.

Each dimensional pattern has a number of key points, also referred to as states. A key point can be a characteristic pose for a particular gesture. For example, in an arm flapping gesture, a key point can be when the arms are at the highest or lowest positions. In the case of a jump, a key point may be when the object reaches the highest point. Thus, a key point can be a point where the object has a significant change in direction. Each dimension is typically made up of a few key points and flexible zones which are the areas between the key points. At 1006, the system determines whether a new state has been reached. In the course of comparing the positional data to the dimensional patterns, the system determines whether the input (potential) gesture has reached a key point for any of the known gestures. Thus, if a person bends her knees to a certain point, the system may interpret that as a key point for the jump gesture or possibly a squatting or sitting gesture. Another example is a person moving her arms up to a certain point and then moving them down. The point at which the person begins moving her arms down can be interpreted by the system as a key point for the arm flap gesture. At 1008, the system will make this determination. If a new state has been reached for any of the gestures, the system updates a status report to reflect this event at 1010. This informs the system that the person has performed at least a part of one known gesture.

This information can be used for a partial completion query to determine whether a person's movement is likely to be a known gesture. For example, a system can inquire or automatically be informed when an input gesture has met three-quarters or two-thirds of a known gesture. This can be determined by probing the status report to see how many states of a known gesture have been reached. The system can then begin preparing for the completion of the known event. Essentially, the system can get a head start in performing the operation associated with the known gesture.

At 1012, the system checks whether there is a severe mismatch between data from the frame data set and the allowable positional coordinates for each dimensional pattern of each known gesture. A severe mismatch would result for example, from coordinates indicating a change in direction that clearly shows that the gesture does not conform to a particular known gesture (e.g., an arm going up when the system would expect it to go down for a certain gesture). A severe mismatch would first be detected at one of a known gesture's key points. If there is a severe mismatch the system resets the data array for the known gesture with which there was a mismatch at block 1014. The system maintains data arrays for each gesture in which the system stores information regarding the "history" of the movements performed by the person and captured by the camera. This information is no longer needed if it determined that it is highly unlikely that the movements by the person will match a particular known gesture. Once these data arrays are cleared so they can begin storing new information, the system also resets the status reports to reflect the mismatch at block 1016. By clearing the status report regarding a particular gesture, the system will not provide misleading information when a partial completion query is made regarding that gesture. The status report will indicate, at the time there is a severe mismatch, that no part of the particular gesture has been completed. At 1018, the system will continue obtaining and processing input image frames of the person performing movements in the range of the camera as shown generally in FIG. 8A.

Returning to block 1008, if a new state has not been reached for any of the known gestures, the system continues with block 1012 where it checks for any severe mismatches. If there are no severe mismatches, the system checks whether there is a match between the coordinates in the frame data set and any of the known gestures in block 1020. Once again, this is done by comparing the positional coordinates from the frame data to the coordinates of a particular point along the characteristic pattern of each dimension of each of the known gestures. If there is a less-than-severe mismatch, but a mismatch nonetheless, between the positional coordinates and a known gesture, the most recent data in the known gesture's data arrays is kept and older data is discarded at 1022. This is also done if a timing constraint for a state has been violated. This can occur if a person holds a position in a gesture for too long. In a preferred embodiment, the subject's gesture should be continuous. New data stored in the array is stored from where the most recent data was kept. The system then continues obtaining new image input frames as shown in block 1018.

If the system determines that the movements performed by the person match a known gesture, a recognition flag for that gesture is set at 1024. A match is found when the sequence of positional coordinates from consecutive frame data sets matches each of the patterns of positional coordinates of each dimension for a known gesture. Once a match is found, the system can perform an operation associated with the known and recognized gesture, such as transforming the person to another image or augmenting the person, as shown on a computer monitor. However, the system will also continue obtaining input image frames as long as the person is moving within the range of the camera. Thus, control returns to block 1018.

In a preferred embodiment of the present invention, it is possible for the user to enter new gestures into the system, thereby adding them to the system library of known or recognized gestures. One process for doing this is through training the system to recognize the new gesture. The training feature can also be used to show the system how a particular person does one of the already known gestures, such as the arm flap. For example, a particular person may not raise her arms as high as someone with longer arms. By showing the system how a particular person performs a gesture, the system will be more likely to recognize that gesture done by that person and recognize it sooner and with a greater confidence level. This is a useful procedure for frequent users or for users who pattern one gesture frequently.

Figure 11A:
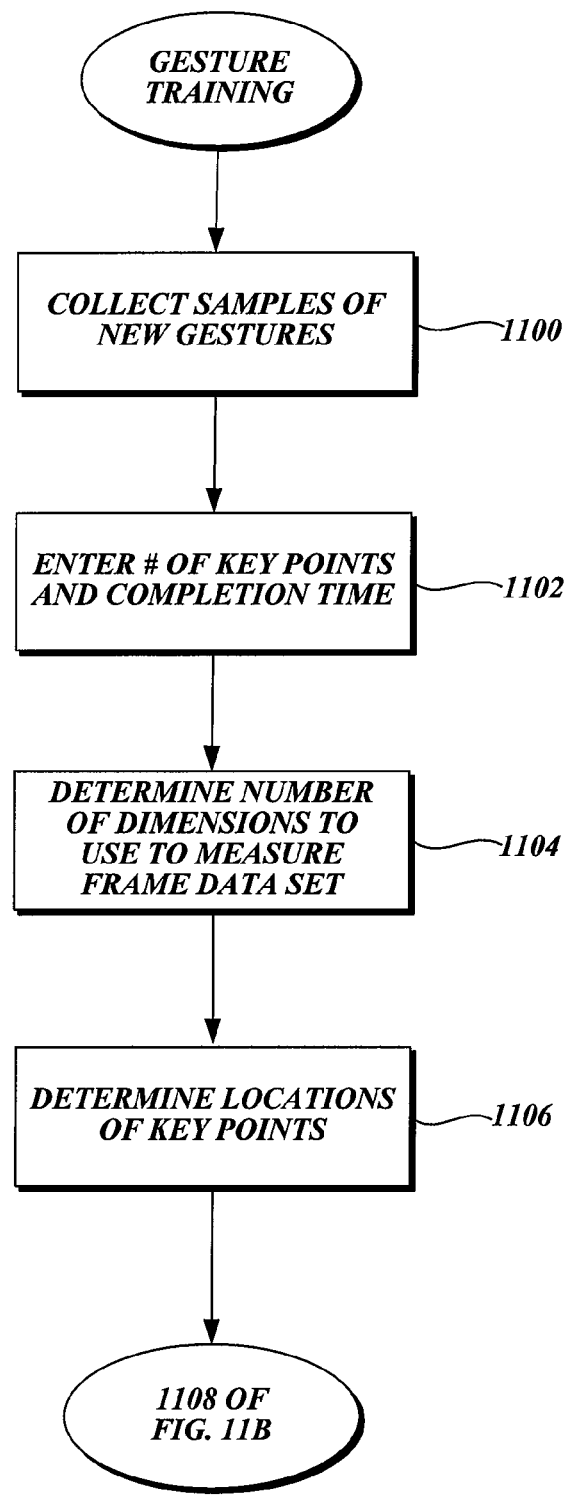
FIGS. 11A and 11B are flowcharts showing a process for training the system to recognize a new gesture.
Figure 11B:
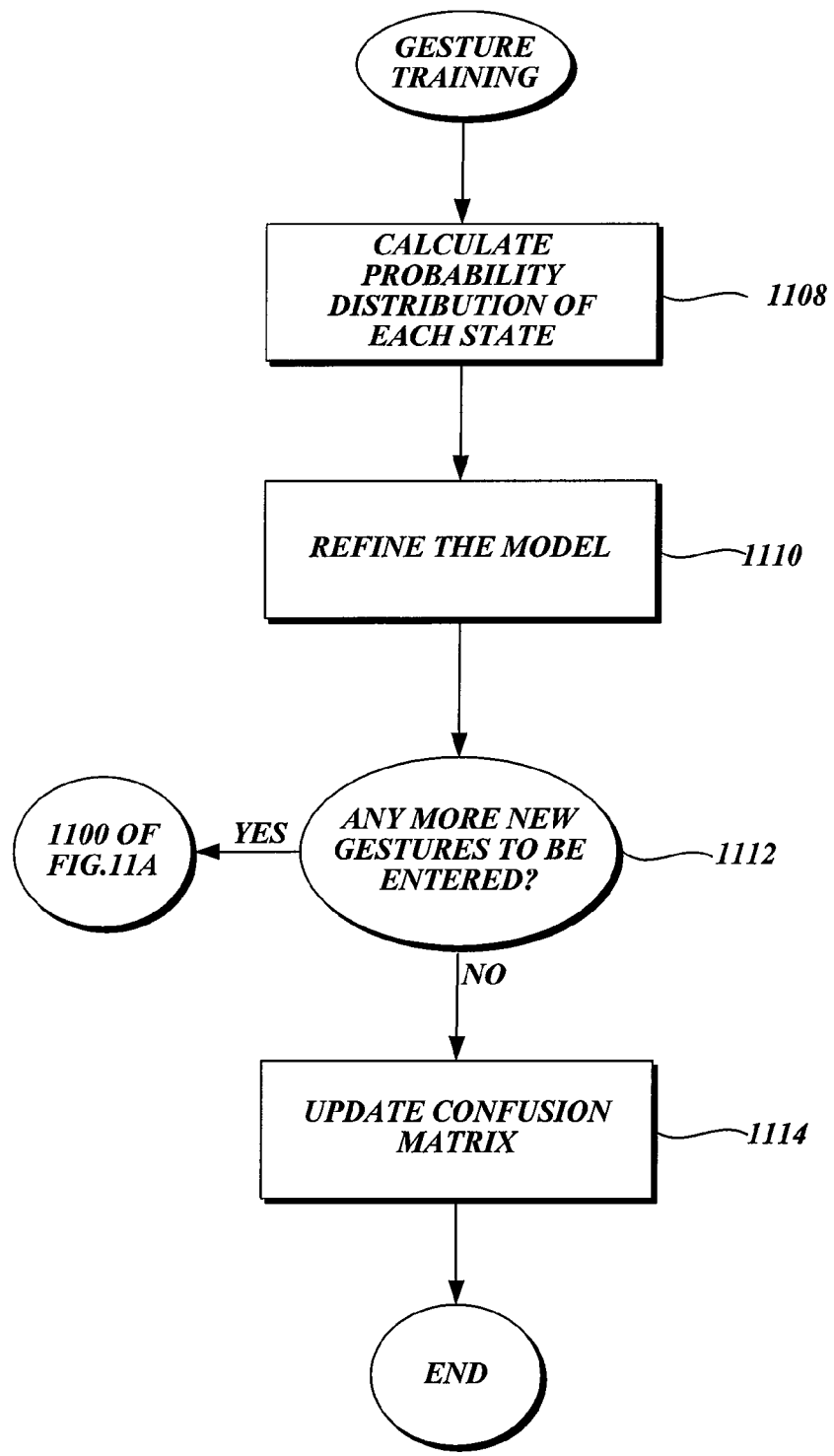

FIGS. 11A and 11B are flowcharts showing a process for training the system to recognize a new gesture. At 1100, the system collects samples of the new gesture. One method of providing samples of the new gesture is for a person to enter the field of the camera and do the gesture a certain number of times. This, naturally, requires some user intervention. In a preferred embodiment, the user or users performs the new gesture about 30 times. The number of users and the number of samples have a direct bearing on the accuracy of the model representing the new gesture and the accuracy of the statistics of each key point (discussed in greater detail below). The more representative samples provided to the system, the more robust the recognition process will be.

At 1102, the number of key points in the gesture is entered as well as the complete time it takes to finish one full gesture, from start to finish. Essentially, in blocks 1100 and 1102, the system is provided with a sequence of key points and flexible zones. The number of key points will vary depending on the complexity of the new gesture. The key points determine what coordinates from the input frame data set should be extracted. For example, if the new gesture is a squatting movement, the motion of the hands or arms is irrelevant. At 1104, the system determines what dimensions to use to measure the frame data set. For example, a squatting gesture may have two dimensions whereas a more complex gesture may have four or five dimensions. In block 1106, the system determines the location of the key points in a model representing the new gesture based on the starting and ending times provided by the user. The system does this by finding the most prominent peaks and valleys for each dimension, and then aligning these extremes across all the dimensions of the new gesture.

At 1108, the system calculates a probability distribution of each state or key point in the model. The system has a set of routines for calculating the statistics at the key points given the set of sample gestures. The statistics of interest include the mean and variance values for each dimension of the gesture and statistics regarding the timing with respect to the start of the gesture. Using these means and variances, the system sets the allowable upper and lower bounds for the key points, which are used during the recognition phase to accept or reject the incoming input frame data sets as a possible gesture match. The system will examine the samples and derive a probability for each key point. For example, if an incoming gesture reaches the third state of a four-state gesture, the probability that the incoming gesture will match the newly entered gesture may be 90%. On the other hand, if an incoming gesture meets the newly entered gesture's first state, there may only be a 10% probability that the incoming gesture will match the newly entered gesture. This is done for each key point in each dimension for the newly entered gesture.

At 1110, the system refines the model representing the new gesture by trying out different threshold values based on a Gaussian distribution. At this stage a first version of the model has already been created. The system then runs the same data from the initial samples and some extraneous data that clearly falls outside the model through the model. The system then determines how much of the first set of data can be recognized by the initial model. The thresholds of each state are initially set narrowly and are expanded until the model can recognize all the initial samples but not any of the extraneous data entered that should not fall within the model. The purpose of this is to ensure that the refined model is sufficiently broad to recognize all the samples of the gesture but not so broad as to accept arbitrary gestures (as represented by the extraneous data). Essentially, the system is determining what is an acceptable gesture and what is not.

At 1112, the system checks if there are any more new gestures to be entered into the system by examining frames of the subject's movements. If the system does not detect any additional movements by the subject, it proceeds to block 1114.

At 1114, the system updates a gesture confusion matrix. The matrix has an entry for each gesture known to the system. The system checks the newly trained gesture against existing gestures in the library for confusability. If the newly trained gesture is highly confusable with one or more existing gestures, it should be retrained using more features or different features. In a preferred embodiment the matrix would be made up of rows and columns in which the columns represent the known gestures and the rows represent or contain data on each of the gestures. A cell in which the data for a gesture, for example, jump, intersects with the jump column, should contain the highest confusability indicator. In another example, a cell in which a jump column intersects with a row for arm flap data should contain a low confusability factor or indicator. Once the confusion matrix has been set for the newly entered gesture, the system continues monitoring for additional movements by the subject starting with block 802 of FIG. 8A.

In another embodiment, virtual buttons may be enabled. For example, moving a hand may control movement of a cursor on the screen. Pushing the hand forward may indicate pressing a button positioned under the cursor on the screen.

In operation 556, the user is given the opportunity to purchase the object with which his or her image is interacting. The purchase may be completed in operation 558. Statistics are collected in operation 560 in a manner similar to that presented above. The user is given a choice to continue or quit in operation 562. If the user wishes to continue, operations 550 through 562 are repeated until the user wishes to quit. A record of the occurrences is offered to the user in operation 564 and created in operation 566.

Figure 6:
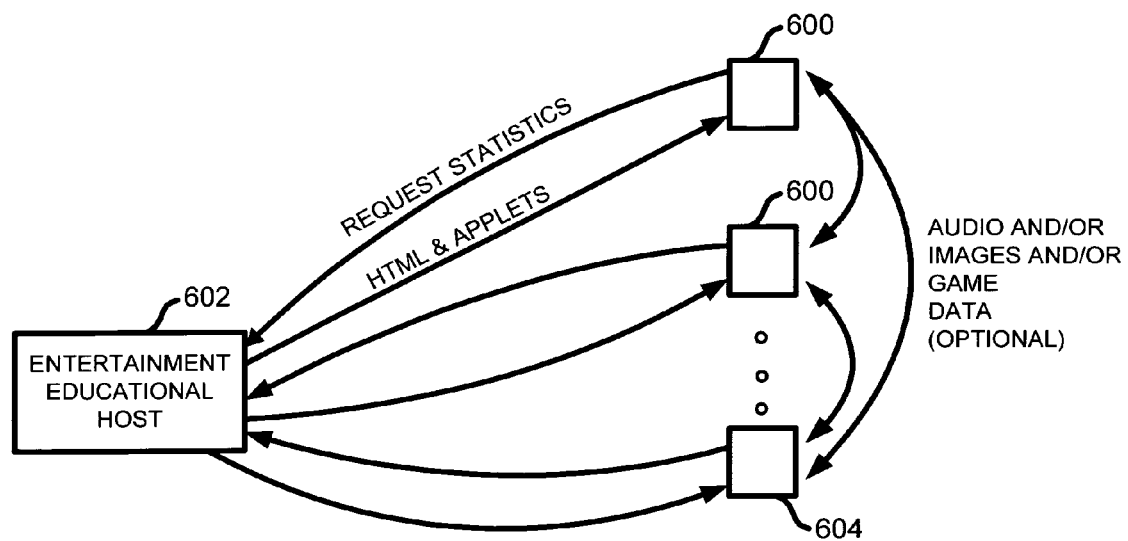
FIG. 6 illustrates an entertainment/educational model of the present invention corresponding to blocks B and C of FIG. 2.

FIG. 6 illustrates an entertainment/educational model of the present invention corresponding to blocks B and C of FIG. 2. In an entertainment model, users 600 connect to a host 602 and are allowed to request entertainment content such as audio, video, and game data. In an educational model, the users 600 are students that connect to the host 602 and request educational content such as audio and video. Content in the form of HTML and applets is sent to the users 600. Further, audio and/or images, and optionally, game data may be transmitted between the users, such as during a group game or when attending a virtual classroom. Optionally, a moderator 604 such as a referee of a game or an instructor may communicate with the host and/or the users. The moderator 604 may receive different applets than the users 600 to enable the moderator 604 to moderate a gaming or educational session.

The host 602 may receive statistics on the browsing habits of each of the users 600, such as how long a user 600 was connected to the host 602 and how long the user 600 used interactive content. Further, group statistics may be collected. The statistics may also be used during subsequent game plays to provide information about games that players particularly like playing as well as to modify a skill level of a game for a particular player. It should be noted that the entertainment/educational model is given by way of example and in no way is it intended to limit the present invention.

Figure 7:
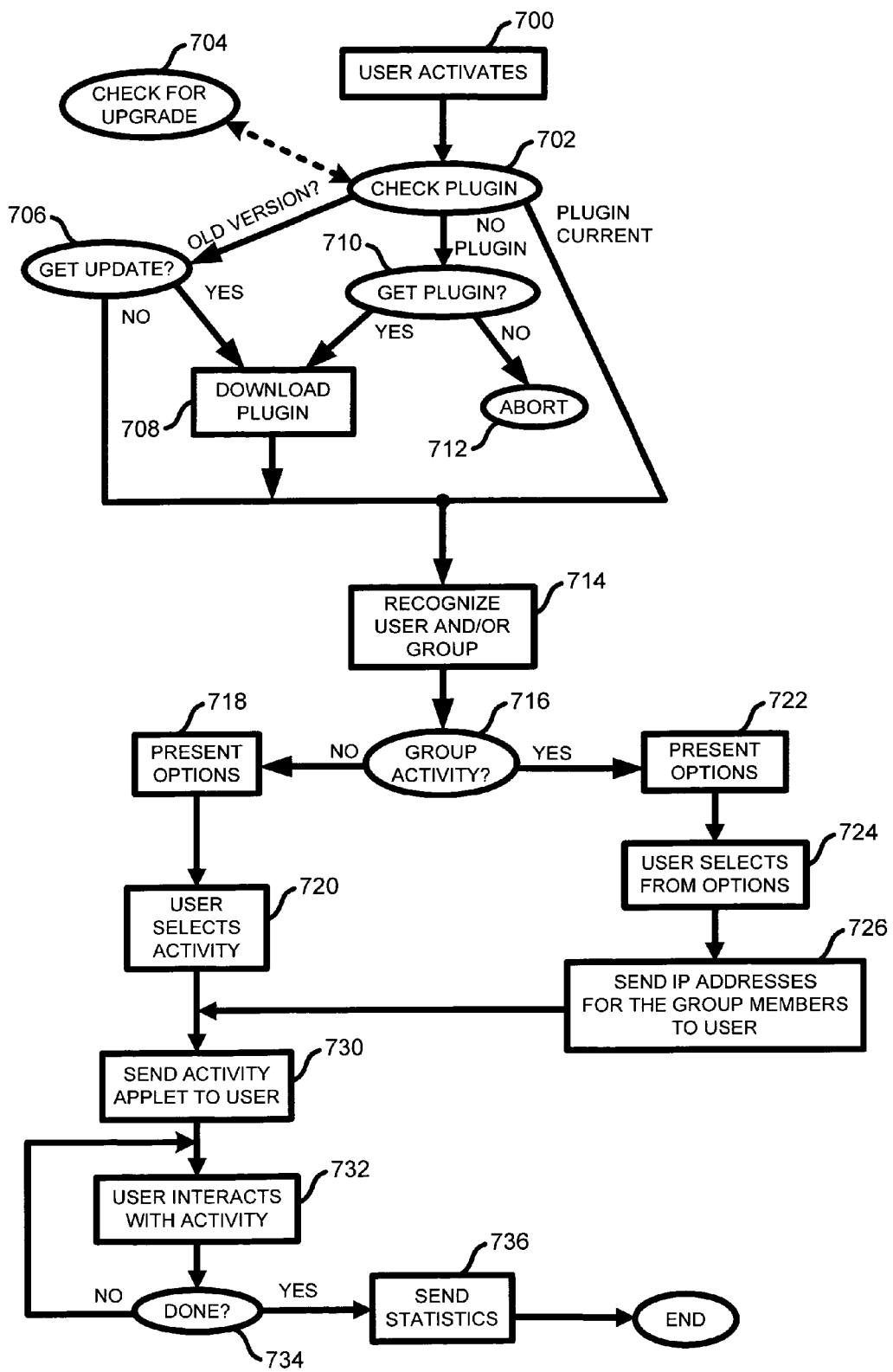
FIG. 7 illustrates a process flow of the entertainment/educational model shown in FIG. 6 in accordance with one embodiment of the present invention.

FIG. 7 illustrates an exemplary process flow of the entertainment/educational model shown in FIG. 6. In operation 700, a user activates an entertainment or educational session by connecting to the host 602. The host may provide a listing of the vision-enabled content available to the user from which the user may choose. In operation 702, the host looks for the plug in on the user's station. Optionally, the plug in may connect to the technology provider's website to check for an upgrade in operation 704. This may occur in the background. If the plug in is current, the process continues. If the plug in is not current, the user is given the option of downloading the update in operation 706. If the user chooses to get the update, it is downloaded onto the user's station in operation 708. If the user chooses not to get the update, the process continues.

If the plug in is not found, the user is given the option to get the plug in operation 710. If the user chooses to get the plug in, it is downloaded onto the user's station, as in operation 708. If the user chooses not to get the plug in, the process is aborted in operation 712.

In operation 714, a user recognition process is performed to identify the user and/or a group to which the user belongs. This allows the host to target options towards the user or group. In the entertainment embodiment, for example, past user performance may be used to group the user with game players of similar skill. See the previous discussion with reference to FIG. 5A for a description of the recognition process.

With continuing reference to FIG. 7, a determination of whether the entertainment or educational activity will be interacted with by the user individually or with a group is made in operation 716. If the activity is to be performed by the user individually, options are presented in operation 718. In operation 720, the user is allowed to select the desired activity, i.e., entertainment activity or educational application, from the options presented in operation 718 and the process continues.

If the activity is to be performed by a group, options are presented in operation 722 and the user selects an activity from the options in operation 724. Based on the activity selected by the user in operation 724, an IP address for the group members is sent to the user in operation 726. This allows the members of the group to interact directly with each other without the host once the applet is received from the host, though the group activity may be performed through the host as well.

In operation 730, the applet corresponding to the selected activity is sent to the user. The user and/or group is allowed to interact with the activity in operation 732. In other words, the user plays the game, attends a virtual lecture, etc. Operation 732 is repeated until it is determined in operation 734 that the user or group has completed interacting with the activity. In operation 736, statistics are sent to the host, which may be used to create and supplement user and/or group profiles.

In an exemplary entertainment scenario, a group of users each having the proper plug in connect to an entertainment host to play a group game. Each user receives the applet associated with the game to be played from the host over a wide area network. In the game, each player is represented by an animated character. After a visual image of each of the users is obtained, a person image is recognized and body part recognition is performed on each of the images of the user to separate out a head, arms, and torso of the user, for example. The background is also separated from the person image. Then, the person image of the head of each player is composited to the animated character corresponding to that player and either the person image or data representing the animated character is distributed to each of the users. The game is played either through the host or among the players across the network. During play, each animated character bears the likeness of the associated player. Optionally, movement of a player during play is recognized and the corresponding animated character performs similar movements.

Depending on the game, interactions between the animated characters and objects appearing on the display may be required. For example, contact and collisions of the objects with the animated characters, as well as the animated characters with each other, may form part of the game, as in a game of virtual basketball. In such case, the contact and/or collision is detected and the objects and/or animated characters are made to react accordingly. More information concerning detecting interactions between the animated characters and objects may be found in a patent application entitled "SYSTEM, METHOD AND ARTICLE OF MANUFACTURE FOR DETECTING COLLISIONS BETWEEN VIDEO IMAGES GENERATED BY A CAMERA AND AN OBJECT DEPICTED ON A DISPLAY" filed Jul. 30, 1999 and herein incorporated by reference in its entirety.

In another exemplary entertainment scenario, a user is watching television. An applet that allows remote control of the television is enabled. The user's movements are recognized. Different movements of the user implement different commands, such as changing the volume and switching channels. Optionally, the user may be recognized upon turning the television on, and the user's favorite channel would be tuned to.

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present include all such alternatives, modifications, permutations, and equivalents.

What is claimed is:

1. A method, comprising:
   receiving a number of image frames of a user performing a gesture;
   performing a body part recognition on one or more of the image frames to recognize a hand of the user;
   detecting a forward movement of the hand as a button press gesture by:
      repeating for a plurality of the image frames:
         analyzing one of the image frames to determine particular coordinates of the hand at a particular time while the user is performing the gesture;
         adding the particular coordinates to a frame data set; and
         examining the particular coordinates such that the particular coordinates are compared to positional data making up a plurality of recognizable gestures, wherein a recognizable gesture is made up of at least one dimension such that the positional data describes dimensions of the recognizable gesture; and
      determining whether the plurality of the data frame sets, when examined in a sequence, conveys a gesture by the user that resembles a recognizable button press gesture to cause an operation based on a predetermined meaning of the recognizable button press gesture.

2. The method of claim 1, wherein the operation is a control of a device.

3. The method of claim 2, wherein the device is a television.

4. The method of claim 1, wherein the operation is control navigation of a web page.

5. The method of claim 1, wherein the operation is control of vision-enabled content.

6. The method of claim 5, wherein the vision-enabled content includes at least one of advertising content, entertainment content or education content.

7. A system for identifying a button press gesture, including:
   a camera for obtaining a number of image frames of a user;
   a processor; and
   a memory coupled with the processor, wherein the memory is configured to provide the processor with instructions that, when executed, cause the processor to:
      perform a body part recognition on one or more of the image frames to recognize a hand of the user;
      detect a forward movement of the hand as a button press gesture by:
         repeating for a plurality of the image frames:
            analyzing one of the image frames to determine particular coordinates of the hand at a particular time while the user is performing a gesture;
            adding the particular coordinates to a frame data set; and
            examining the particular coordinates such that the particular coordinates are compared to positional data making up a plurality of recognizable gestures, wherein a recognizable gesture is made up of at least one dimension such that the positional data describes dimensions of the recognizable gesture; and
         determining whether the plurality of the data frame sets, when examined in a sequence, conveys a gesture by the user that resembles a recognizable button press gesture to cause an operation based on a predetermined meaning of the recognizable button press gesture.

8. The system of claim 7, wherein the memory is further configured to provide the processor with instructions that, when executed, cause the processor to control a device upon detection of the button press gesture.

9. The system of claim 8, wherein the device is a television.

10. The system of claim 7, wherein the operation controls navigation of a web page.

11. The system of claim 7, wherein the operation controls vision-enabled content.

12. The system of claim 11, wherein the vision-enabled content includes at least one of advertising content, entertainment content or education content.

13. A computer program product for identifying a button press on a device, the computer program product being embodied in a computer storage medium and comprising computer instructions for:
   receiving a plurality of image frames of a user performing a gesture;

performing a body part recognition on each of the image frames to recognize a hand of the user; and identifying a button press on the device by detecting a button press gesture by:

analyzing the image frames to determine coordinates of the hand at particular times while the user is performing the gesture; and comparing the coordinates to a sequence of coordinates that define a button press gesture.

14. The computer program product of claim 13, wherein the instructions include instructions for:

analyzing each of the plurality of image frames for coordinates of the hand and adding the coordinates to a frame data set associated with the image frame; and determining whether the plurality of the data frame sets, when examined in a sequence, conveys a button press gesture by the user.

15. The computer program product of claim 13, further comprising computer instructions for using the identified button press to control the device.

16. The computer program product of claim 15, wherein the device is a television.

17. The computer program product of claim 13, further comprising instructions for controlling navigation of a web page upon the identification of the button press.

18. The computer program product of claim 13, further comprising instructions for controlling vision-enabled content upon the identification of a button press.

19. The computer program product of claim 18, wherein the vision-enabled content includes at least one of advertising content, entertainment content or education content.

20. A system, comprising:

means for receiving a number of image frames of a user performing a gesture;

means for performing a body part recognition on one or more of the image frames to recognize a hand of the user;

means for detecting a forward movement of the hand as a button press gesture by:

repeating for a plurality of the image frames:

analyzing one of the image frames to determine particular coordinates of the hand at a particular time while the user is performing the gesture;

adding the particular coordinates to a frame data set; and examining the particular coordinates such that the particular coordinates are compared to positional data making up a plurality of recognizable gestures, wherein a recognizable gesture is made up of at least one dimension such that the positional data describes dimensions of the recognizable gesture; and determining whether the plurality of the data frame sets, when examined in a sequence, conveys a gesture by the user that resembles a recognizable button press gesture to cause an operation based on a predetermined meaning of the recognizable button press gesture.

* * * * *